No. 718,492. PATENTED JAN. 13, 1903.
H. R. MASON.
FLUID PRESSURE MECHANISM.
APPLICATION FILED MAY 8, 1901.
NO MODEL.
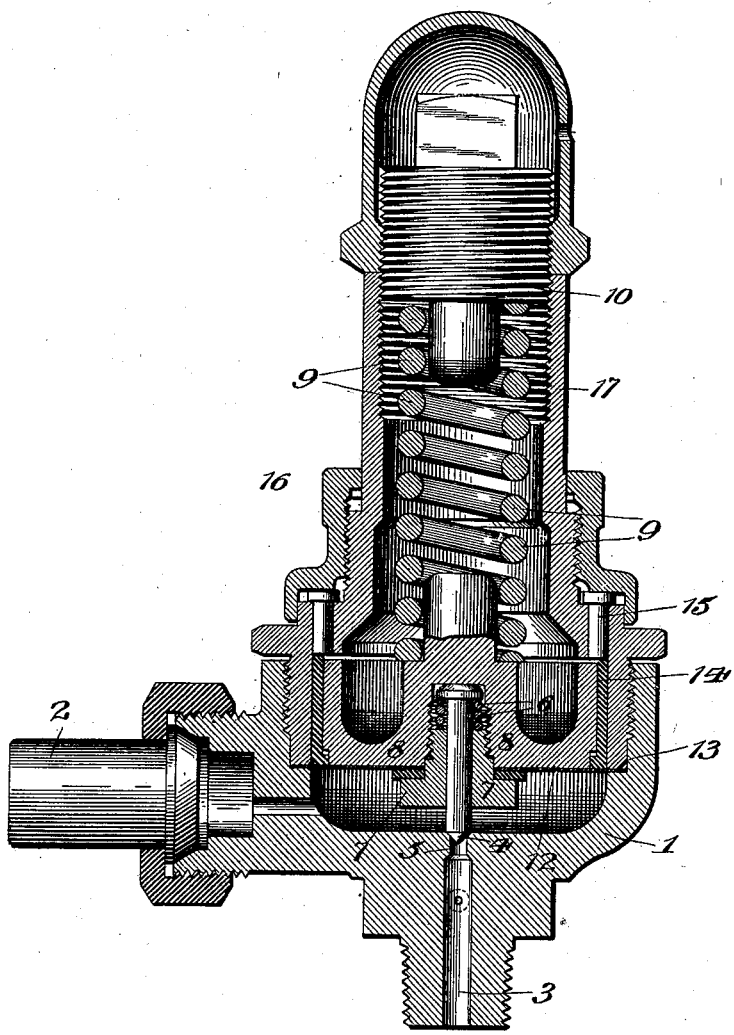
Witnesses:
Chas. E. Gaylord,
John Enders Jr.
Inventor:
Harry R. Mason,
By E. Wright
Atty.

UNITED STATES PATENT OFFICE.

HARRY R. MASON, OF CHICAGO, ILLINOIS, ASSIGNOR TO THE WESTINGHOUSE AIR BRAKE COMPANY, OF PITTSBURG, PENNSYLVANIA, A CORPORATION OF PENNSYLVANIA.

FLUID-PRESSURE MECHANISM.

SPECIFICATION forming part of Letters Patent No. 718,492, dated January 13, 1903.

Application filed May 8, 1901. Serial No. 59,243. (No model.)

*To all whom it may concern:*

Be it known that I, HARRY R. MASON, a citizen of the United States of America, residing at Chicago, in the county of Cook and State of Illinois, have invented certain new and useful Improvements in Fluid-Pressure Mechanism, (Case No. 2,) of which the following, taken in connection with the accompanying drawing, is a specification.

My invention has relation to the provision of an improved form of fluid-pressure mechanism in which a certain controlling device is arranged to be actuated by any one of a plurality of fluid-pressures, said controlling device being combined with means whereby any one of the pressures can be brought into operation at will.

Another object of my invention is the combination, with a suitable controlling device or valve, of a single diaphragm subject to fluid-pressure upon one of its sides and to the pressure of a spring upon its other side constructed to act as a motor for said controlling device or valve, said diaphragm being used in conjunction with mechanism for varying the effective area thereof, said mechanism, as well as the coöperating parts, being illustrated in preferred form in the accompanying drawing, in which there is shown a valve-casing 1, provided with a fluid-pressure inlet 2 and an outlet 3, controlled by means of a controlling device or valve 4, arranged to govern the port 5, which establishes communication between the inlet 2 and the outlet 3. The valve 4 is held by a spring 6 and nut 7 in the movable piston 8, which has a spring 9 subject to adjustable tension through the adjusting-screw 10, bearing upon a shoulder 11 on the upper end of the piston, so as to exert a pressure upon the piston tending to seat the valve. Against the under face of the piston and held thereto by means of the head on the nut 7 is a diaphragm or movable abutment 12, the outer end of which is secured firmly in place in the casing 1 by means of an annular nut 13, between which and the piston there is an adjustable ring or movable bushing 14, upon the upper edge of which press a plurality of pins 15, adapted to be forced down by rotation of the nut 16, which has screw-threaded engagement with the spring-case 17, the lower end whereof forms the annular nut 13.

The operation of my invention is as follows: Pressure being admitted through the opening 2 acts upon the diaphragm 12 to move the piston upwardly against the resistance of the spring 9 and unseat the valve 4, the latter being raised and permitting the fluid to pass into the outlet 3 as soon as the pressure acting upon the effective area of the diaphragm 12 becomes sufficiently great to overcome the resistance of the spring 9 as determined by the adjustment of the nut 10. When the ring 14 is in the position shown in the drawing—that is, when it bears upon the upper side of the diaphragm with the valve in closed position—only so much of the area of the diaphragm is available for exerting a lifting force upon the valve as is contained within the inner diameter of the ring or bushing, and in such position a relatively high pressure will be required because of the small area available to overcome a predetermined resistance of the spring 9. If now it be desired to have the valve open at a lower pressure, the effective area of the diaphragm may be increased by slightly unscrewing the nut 16, thus permitting the ring or bushing 14 to be pushed upward by the air-pressure under the diaphragm, which has the effect substantially of bringing into operation as much additional area of the diaphragm as is represented by the area of the end of the ring. Thus the diaphragm in combination with the mechanism shown is practically a diaphragm with a variable area, and the ring and the adjusting-nut 16 are the means shown for securing the desired degree of variation in the diaphragm area.

It will be clearly seen that with the mechanism which I have above described the controlling device or valve can be made to operate at either of two pressures without the devices having been materially complicated, and it will also be evident that if it were desired to carry the invention still further a second adjustable ring or movable bushing could be inserted, with means for moving it into or out of operation, so that by the invention disclosed it is possible to provide means for causing a single valve under the pressure of a single spring and a single adjusting device for determining the tension of the spring to be capable of actuation at any one of a plurality of pressures, as may be desired.

Having thus described my invention, what I claim as new, and desire to secure by Letters Patent, is—

1. A fluid-pressure mechanism, comprising a controlling-valve, a movable abutment connected therewith, means for exerting a yielding pressure upon said movable abutment in opposition to the fluid-pressure, and mechanism operable from the outside of the casing for varying the effective area of said movable abutment, substantially as described.

2. A fluid-pressure mechanism, comprising a valve, a movable abutment therefor, a spring for resisting the movement of the movable abutment in opposition to the fluid-pressure, an adjustable ring for varying the effective area of said movable abutment and means for adjusting said ring from the outside of the casing, substantially as described.

3. A fluid-pressure mechanism, comprising a valve-casing, a valve, a diaphragm connected with said valve, a piston upon the side of said diaphragm opposite the side which is exposed to fluid-pressure, a spring bearing upon said piston, an adjustable ring adapted to bear upon said diaphragm outside said piston, and means for bringing said ring into contact with said diaphragm for varying the effective area of the latter, substantially as described.

In testimony whereof I have hereunto set my hand in the presence of two subscribing witnesses.

HARRY R. MASON.

Attest:
PAUL CARPENTER,
H. W. SMALLEY.